W. W. DUSENBURY.
Pump Valve.
No. 232,951.  Patented Oct. 5, 1880.
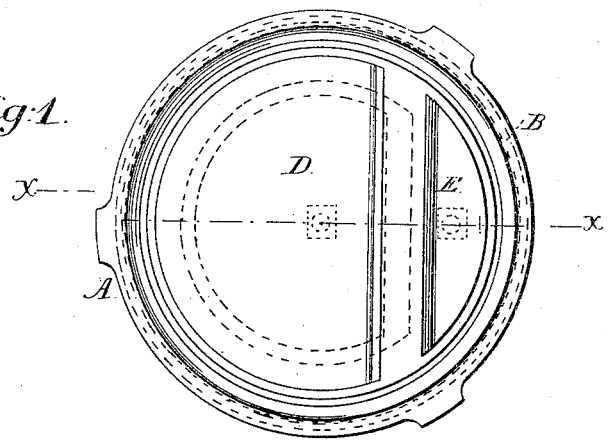
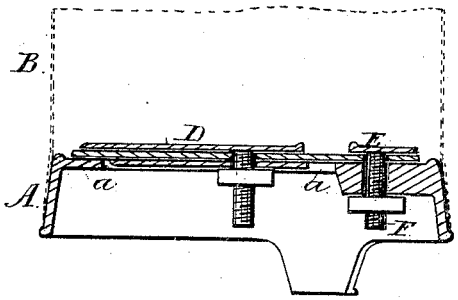
WITNESSES:
E. C. Fernald,
John D. James.
INVENTOR:
W. W. Dusenbury,
BY W. C. Donn,
ATTORNEY.

UNITED STATES PATENT OFFICE.

WILLIAM W. DUSENBURY, OF BROOKLYN, NEW YORK.

PUMP-VALVE.

SPECIFICATION forming part of Letters Patent No. 232,951, dated October 5, 1880.

Application filed July 21, 1879.

*To all whom it may concern:*

Be it known that I, WILLIAM W. DUSENBURY, of Brooklyn, in the county of Kings and State of New York, have invented a new and useful Improvement in Pump-Valves, of which the following is a specification.

My invention relates to improvements in attaching valves to the fixed bottoms of ordinary sheet-metal pumps; and the object thereof is to attach the valve so that when it wears out or needs repairing it can be removed from the inside of the pump without disconnecting the fixed bottom from the pump-barrel.

This invention consists in fastening the valve to the upper side of the valve-seat by means of a clamping-plate provided with a threaded stud or studs projecting from its under side, the said clamping-plate being adapted to clamp the fixed part of the valve against its support, and thus form a water-tight joint, while the stud or studs are passed through the valve and its support, and as the stud forms part of the clamping-plate, which prevents it from turning, a nut is screwed on the end of the stud from the outside, against the under side of the valve seat or support, for the purpose of drawing the clamping-plate down on the valve.

In the accompanying drawings, Figure 1 represents a top plan of my improved valve. Fig. 2 represents a vertical cross-section of the same, taken on line *x x* of Fig. 1.

Referring to the drawings, A represents the bottom of an ordinary sheet-metal pump, such as is used on canal and other boats. The said bottom is permanently fixed in the lower end of the pump-barrel B (represented by dotted lines) by solder or other equivalent means.

The bottom is provided with an opening or openings for the passage of water into the pump, and from its upper edge projects a flange forming a continuous valve-seat, *a*.

D represents the valve, made in the usual manner, of a leather, rubber, or other flexible plate attached to a metal plate or plates. The edges of the valve rest on the top of the valve-seat all around, so that when the valve is closed a water-tight joint is formed. One part of the valve forms the hinge, on which the valve swings. This portion is clamped from above against the seat or other support by a clamping-plate, E.

The clamping-plate is provided with a fixed stud or studs, F, projecting from its under side, which is passed through the fixed part of the valve and a corresponding hole in the support, to which the valve is hinged. The stud projects below the seat or support, and on its end is screwed a nut, which is screwed against the under side of the valve-support, and as the stud is rigidly connected with the clamping-plate the latter is drawn down by the stud and is caused to clamp the fixed part of the valve against the upper surface of the support, and thus form a water-tight joint between the fixed part of the valve and the seat or support with which it is connected.

To remove the valve from the pump it is only necessary to unscrew the nut from the stud F and then raise the valve until the stud clears the hole in the support, when the valve can be drawn through the opening in the bottom. To replace it the stud is passed through the valve so that the clamping-plate rests against the upper side of the valve, which is then passed through the opening, and the stud being guided to the hole in the seat or support is passed through and secured by the nut, as before.

If a double or two-wing valve is employed, the clamping-plate may be laid across the valve diametrically over the bar or bridge, to which the valve is attached.

More than one stud may be attached to or form part of the clamping-plate.

The bottom A is the ordinary bottom employed in sheet-metal pumps. Heretofore it has been the practice to fasten the valve either by an ordinary screw passed through the fixed portion of the valve into the support from above and within the pump-barrel, or by means of a loose bolt passed through in the same manner and fastened by a nut below and outside of the pump-barrel. Both of these methods are defective, the first because it is impossible to remove the screw from the outside, and the second, because, as there is no way of holding the bolt the nut cannot be unscrewed. In both cases, therefore, to take out the valve it is necessary to unsolder the bottom from the pump-barrel, and this is both expensive and inconvenient.

My improvement obviates the necessity of taking the bottom from the pump-barrel, as the valve can be taken out, repaired, and replaced, or a new one put in, without trouble or expense and in a very short time. At the same time the position of the valve with relation to the valve-seat remains unchanged, so that the improvement can be applied immediately to any pump now in use.

I am aware that an arrangement for overcoming the necessity of removing the bottoms from pump-barrels is shown in Letters Patent No. 148,775, granted to S. Steward March 17, 1874, by attaching the valve to the underside of the support instead of above; but this I do not claim, as my invention is applicable only to the bottom A and valve when arranged relatively to each other in the ordinary well-known manner.

I claim—

In combination with the pump-bottom A, provided with a continuous valve-seat $a$, and the valve D, the clamping-plate E, provided with the rigidly-attached stud F, and a suitable fastening for engaging the end of the stud, and through the stud clamping the plate E on the fixed part of the valve, as and for the purpose substantially as described.

WILLIAM W. DUSENBURY.

Witnesses:
C. SEDGWICK,
WILTON C. DONN.